Nov. 28, 1961   H. SANDKVIST   3,011,013
METHOD FOR CONNECTING CONCENTRIC MEMBERS
Filed Nov. 16, 1959
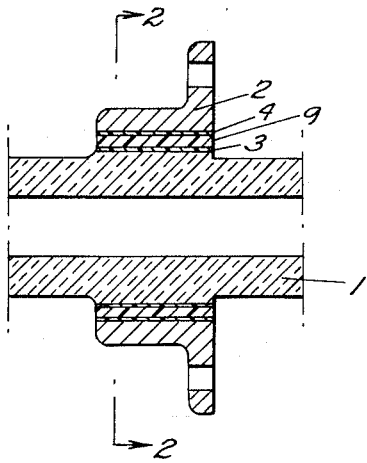
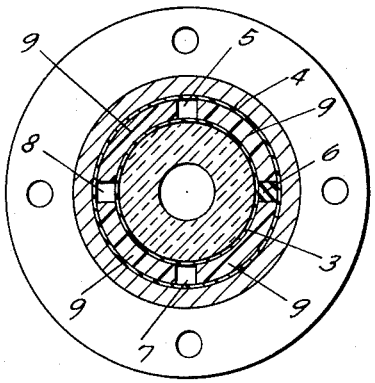
INVENTOR.
Hugo Sandkvist.
BY
Attorney.

3,011,013
METHOD FOR CONNECTING CONCENTRIC MEMBERS

Hugo Sandkvist, Ludvika, Sweden, assignor to Allmanna Svenska Elektriska Aktiebolaget, Vasteras, Sweden, a corporation of Sweden
Filed Nov. 16, 1959, Ser. No. 853,185
Claims priority, application Sweden Nov. 19, 1958
5 Claims. (Cl. 174—152)

This invention relates to a method for joining two concentric members such as a tubular porcelain insulator and a circular metal flange for supporting the insulator.

When two bodies of different thermal characteristics are connected together by some type of adhesive bond having yet another thermal characteristic, it is possible that during large temperature fluctuations, the thermal expansion of the various members will cause a distortion sufficient to fracture the porcelain body.

In accordance with the present invention, the concentric tubular members are provided with a strong bond which is resilient to absorb differential expansion between the two members being connected, as well as the increase or decrease in the volume of the bond with respect to the two members being joined. More specifically, an adhesive bond is provided between concentric members where the bond has at least one axial slot to permit a circumferential expansion of the bond without exerting stress on the members being joined. In addition, the body of the bond can be fastened to the concentric members being joined by an elastic adhesive coating or layer so that a radial and circumferential change in dimension is also absorbed without exerting dangerous radial stresses on the members being joined.

Accordingly, the primary object of the invention is to provide a novel method for connecting concentric members.

Still another object of the invention is to provide a bond for connecting two concentric members which has an axial slot to permit circumferential expansion of the bond without exerting a stress on the members being connected.

A further object of the invention is to provide a bond between two concentric members which is fastened on an elastic coating on at least one of the members to permit radial and circumferential strain to be absorbed by the elastic adhesive during large temperature changes.

These and other objects of this invention will become apparent from the following description when taken in connection with the drawings, in which:

FIGURE 1 shows a side cross-sectional view of a portion of a porcelain insulator connected to a metallic flange by the method of the invention.

FIGURE 2 is a cross-sectional view of FIGURE 1 taken across the lines 2—2 in FIGURE 1.

Referring now to the figures, FIGURE 1 shows a porcelain insulator portion 1 which is to be connected to a metallic flange 2 which will carry insulator 1 from some support body. In the past, there has been great difficulty in forming this connection because of the difference in thermal characteristics of the two concentric members. This difficulty is aggravated when the assembly is exposed to duty which imposes large temperature fluctuations.

In accordance with the present invention, and in order to connect flange 2 to porcelain body 1, elastic adhesive layers 3 and 4 of any suitable material are first coated on the interior surface of flange 2 and the opposing exterior surface of insulator 1. The two members are then held in place by any suitable jig, and spacers are inserted in positions 5, 6, 7 and 8.

The main bonding material, which is preferably an epoxy resin such as Araldite, is then poured into the annularly disposed spaces formed between concentric members 2 and 3, and is permitted to set to a rigid bond. The spacers may then be removed to provide axial slots 5, 6, 7 and 8 of FIGURE 2 in the bond. These slots will permit a circumferential expansion of the epoxy resin which has a high thermal expansivity during thermal fluctuation, and will also permit differential expansion and contraction between concentric bodies 1 and 2 to be absorbed without exerting substantial stress upon the bodies.

In a like manner, the elastic adhesive layers 3 and 4 will permit an absorption of radial and circumferential strain due to the different thermal expansion of bodies 1 and 2 and the epoxy resin bond body 9.

While FIGURES 1 and 2 have shown the use of four axial slots, it is possible to use a single slot. Furthermore, the slot is shown to be square, due to the use of a square spacer. The cross-section of the slot, however, could be of any desired configuration, and could, for example, be formed by a wedge which would replace the need for a jig to hold the members 1 and 2 in relative positions while the epoxy bond 9 is formed.

If the wedges or bars are to be removed after the bond 9 sets, it is preferable to make them conical and to treat the bodies so that the epoxy resin, such as Araldite, will not adhere to them, and permits easy removal after the casting bond becomes stiff.

Note, however, that it is possible to use wedges or bars which are of themselves elastic material so that these wedges or bars illustrated as bar 6 of FIGURE 2 can remain in position after the casting, without preventing distortion of the bond 9 under dimensional change due to temperature fluctuation.

To increase the strength of the joint, it has been found desirable to roughen the adjacent surfaces of the bodies to be joined, as by sanding or some similar technique well known to those skilled in the art.

While the invention has been described here in connection with a porcelain body and a metallic flange, it will be apparent that the invention would apply to the connection of any type of different materials, as well as to the connection of two similar bodies when an epoxy resin is used as the bonding material. That is to say, the extremely desirable bonding characteristics of epoxy resins can be retained, although their undesirable high dimensional fluctuation during temperature change can be easily absorbed by the axial slot.

Although I have described preferred embodiments of my novel invention, many variations and modifications will now be obvious to those skilled in the art, and I prefer therefore to be limited not by the specific disclosure herein but only by the appended claims.

I claim:
1. The method of joining an outer and inner concentric member comprising the steps of, forming an elastic adhesive layer on the outer diameter of said inner member and forming an elastic adhesive layer on the inner diameter of said outer member, securing said outer and inner concentric members with respect to one another by securing rod means axially positioned between said outer diameter of said inner member and said inner diameter of said outer member to form annular chamber segments isolated by said rod means between said outer and inner members and thereafter filling said annular chamber segments with an epoxy resin to secure said adhesive layers of said outer and inner layers to one another, and to thereafter remove said rod means.

2. The method of joining an outer and inner concentric member comprising the steps of, forming an elastic adhesive layer on the outer diameter of said inner member and forming an elastic adhesive layer on the inner diameter of said outer member, securing said outer and inner concentric members with respect to one another by elastic securing rod means axially positioned between said outer diameter of said inner member and said inner diameter of said outer member to form annular chamber segments isolated by said rod means between said outer and inner members and thereafter filling said annular chamber segments with an epoxy resin to secure said adhesive layers of said outer and inner layers to one another.

3. In combination, an annular insulator and a flanged metal ring concentric therewith, said ring having an interior portion adjacent an exterior portion of said insulator, said interior portion of said ring and said exterior portion of said insulator having respective layers of elastic adhesive secured thereto, an annular-shaped bonding means, said annular bonding means having its exterior surface connected to said adhesive layer of said ring and its interior surface connected to said adhesive layer of said insulator, said annular-shaped bonding means having an axial slot therein, said adhesive layers and slot permitting radial and circumferential expansion and contraction of said joined concentric insulator and ring and said bonding means.

4. In combination, an annular insulator and a flanged metal ring concentric therewith, said ring having an interior portion adjacent an exterior portion of said insulator, said interior portion of said ring and said exterior portion of said insulator having respective layers of elastic adhesive secured thereto, an annular-shaped bonding means, said annular bonding means having its exterior surface connected to said adhesive layer of said ring and its interior surface connected to said adhesive layer of said insulator, said annular-shaped bonding means having an axial slot therein, said adhesive layers and slot permitting radial and circumferential expansion and contraction of said joined concentric insulator and ring and said bonding means, said slot being filled with an elastic plug means.

5. In combination, an annular insulator and a flanged metal ring therewith, said ring having an interior portion adjacent an exterior portion of said insulator, said interior portion of said ring and said exterior portion of said insulator having respective layers of elastic adhesive secured thereto, an annular-shaped bonding means, said annular bonding means having its exterior surface connected to said adhesive layer of said ring and its interior surface connected to said adhesive layer of said insulator, said annular-shaped bonding means having an axial slot therein, said adhesive layers and slot permitting radial and circumferential expansion and contraction of said joined concentric insulator and ring and said bonding means, said insulator being of porcelain, said bond being an epoxy resin.

References Cited in the file of this patent

UNITED STATES PATENTS

| | | |
|---|---|---|
| 1,523,240 | Tompkins | Jan. 13, 1925 |
| 2,230,205 | Rowland et al. | Jan. 28, 1941 |
| 2,239,641 | Bierend | Apr. 22, 1941 |
| 2,304,718 | Swart | Dec. 8, 1942 |
| 2,434,555 | Fischer et al. | Jan. 13, 1948 |
| 2,728,425 | Day | Dec. 27, 1955 |